July 22, 1947.  T. KILBOURN  2,424,320
CHAIN
Filed July 6, 1945

INVENTOR
BY Thomas Kilbourn
ATTORNEY

Patented July 22, 1947

2,424,320

UNITED STATES PATENT OFFICE 2,424,320

CHAIN

Thomas Kilbourn, Leicester, England, assignor to Economic Stampings Limited, Leicester, England Application July 6, 1945, Serial No. 603,525
In Great Britain August 17, 1944

6 Claims. (Cl. 66—156)

1

This invention concerns ladder-like chains of the type comprising a series of long parallel cross bars connected by link elements at each edge, and primarily those chains of this type that are employed for patterning or control purposes in Cotton's patent and other knitting machines and in use are equipped with studs or cams fixed to the cross bars at locations in the width and length of the chain as determined by operations and the timing thereof, to be controlled by the chain. Hitherto these patterning or control chains have consisted of interchangeable and detachable links made of bent wire, the cross bar having its ends bent to form hook portions or link elements that hook onto the next cross bar. These known chains are not readily amenable to accurate manufacture and have certain disadvantages. The pitch of the cross bars, which governs the timing, is not constant; the cross bars do not always lie parallel and in any case are very liable to bend (being made from comparatively ductile material); one edge of the chain is apt to be longer than the other, so that the chain is not straight; and the chain is liable to ride up or get slewed across the drum or the like on which it is guided. An object of this invention is an improved construction of chain of the type specified, and particularly an improved timing, control, or pattern chain that is free from the above disadvantages and that is adapted for accurate manufacture.

According to this invention, a chain of the type specified has at each edge a succession of links with their adjacent ends overlapping and having each end of each cross bar transfixing at least two such link ends so as to connect them. That is to say at each edge of the chain there is what may be regarded as a selvedge chain which selvedge chains are connected by the cross bars and have their hinge pins (by which their successive component links are connected together) constituted by the ends of the cross bars. Preferably the links are removably received on the ends of the cross bars and are provided with a readily-removable fastener, such for example as a spring clip engaging a groove in the outer end of the bar at the outer face of the links.

The links are advantageously in the form of metal plates (i. e. being steel or other steel metal pressings or stampings) and are all identical. The cross bars are all identical also, and preferably have each end reduced to provide a shoulder which positions the inner link and a part of reduced diameter which transfixes the overlapping link ends.

2

The invention also includes a chain of the type specified, comprising two selvedge chains connected and spaced by the cross bars, each of which selvedge chains consists of interchangeable and removable links, each having two spaced pivot holes, arranged in succession with overlapping ends wherein the pivot holes register, reduced ends on the cross bars transfixing said registering holes as hinge pins, and readily-releasable fasteners retaining the links on the hinge pins.

The invention still further includes a timing, control, or pattern chain (e. g. in or for a Cotton's patent, straight bar, or other knitting machine) having the features hereinbefore recited and having studs or cams fixed to the cross bars at spaced locations in its length and width.

The foregoing and other features of the invention set out in the appended claims are incorporated in the chain which will now be described as an example with reference to the accompanying drawings in which Figure 1 is a perspective view of a short length of the chain;

Figure 1:
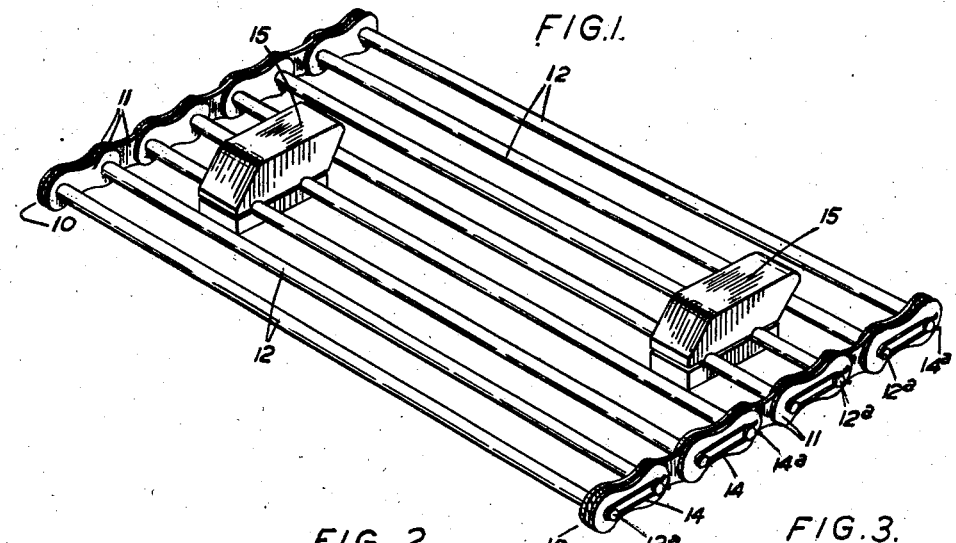
Figures 2, 3:
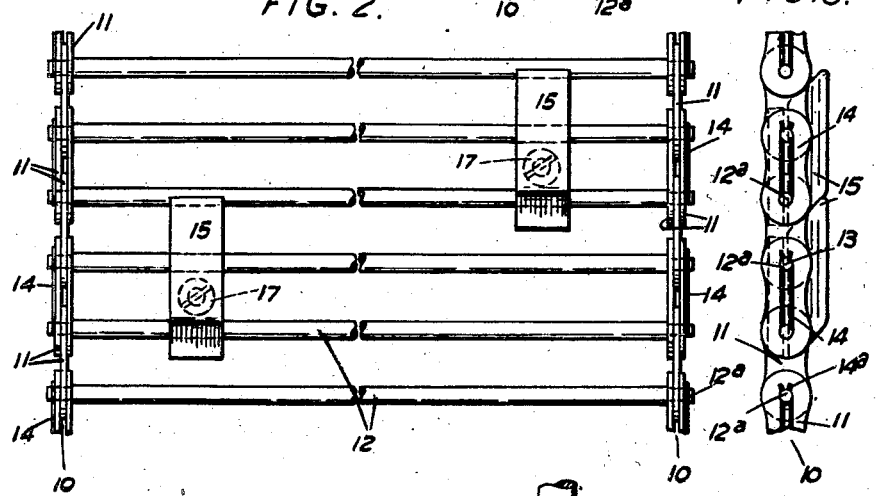
Figure 2 is a plan and Figure 3 a side elevation thereof.
Figures 4, 5:
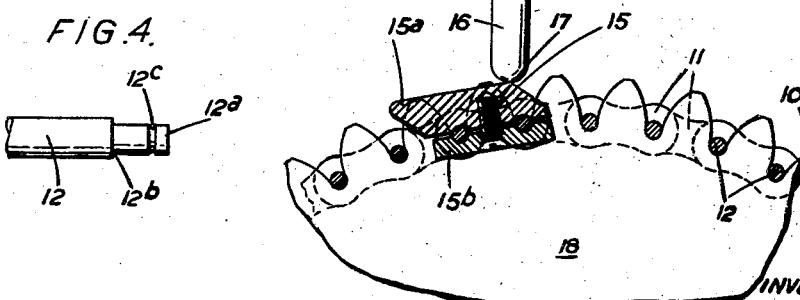
Figure 4 is a view, on a larger scale, of the end of one of the cross bars.
Figure 5 illustrates the use of the chain as a pattern, control, or like chain in a knitting machine.

At each edge of the chain there is a selvedge chain 10 built up of flat, pressed steel links 11, conveniently waisted so as to be of "figure 8" form, and pierced with a pivot hole 13 near each end, the pitch of the holes being that of the cross bars 12. These links 11 are arranged in the order 2, 1, 2 etc., each end of a single link being sandwiched between the ends of the next pair of links with the holes 13 registering. Through these registering holes 13 there is inserted the reduced end 12a of a cross bar 12 (of round steel or other metal rod), the inner link being positioned by the shoulder 12b so that, as each end of the cross bar is reduced, the cross bars 12 serve to space the selvedge chains 10 apart. The reduced end 12a is freely rotatable in the three links 11 that it transfixes and is of such a length as to protrude therefrom. The protruding part is formed with an annular groove or recess 12c receiving a spring clip 14 which serves to retain the links and being readily releasable permits the length of the chain to be varied by the abstraction or addition of links and cross bars at any location. Each spring clip 14 preferably engages the ends 12a of a pair of cross bars, e. g. those that transfix the same pair of links. For this purpose the clip 14 is hairpin shaped; its bend seats in the groove 12c of one bar 12 and its ends 14a curve partly round and seat in the groove 12c in the next bar 12 and then diverge so as to facilitate the operation of springing it open to remove it. This clip is conveniently made of bent spring wire, although it may be pressed or stamped out from thin metal sheet.

It is to be understood that all the links 11, all the cross bars 12, and all the spring clips 14, are identical and interchangeable but chains of various widths may be built up by employing cross bars of the appropriate length.

If the chain is intended as a pattern, control, or timing chain of a knitting machine, cams or studs 15 are fastened to the cross bars 12 at predetermined locations in the width and length thereof in an arrangement determined by the operations that the chain is to control by lifting or pushing plungers or levers 16 as the chain is traversed beneath them over a support or sprocket 18.

Each stud or cam 15 conveniently consists of two members, one, 15a, being the stud proper and the other, 15b, a clamping plate, clamped together by a screw 17 to grip at least two cross bars 12 between them, said cross bars being received in grooves to prevent the stud or cam being displaced lengthwise of the chain.

It will be appreciated that since the cross bars 12 (with which the sprocket teeth mesh) are accurately spaced, over-riding of the chain and undue strain thereon are obviated.

I claim:

1. A timing or patterning chain of the type comprising a series of long parallel cross bars, for the reception of studs or cams, connected by links at each edge, comprising two selvedge chains connected and spaced by the cross bars, each of which selvedge chains consists of interchangeable and removable links, each having two spaced pivot holes, arranged in succession with overlapping ends whereat the pivot holes register, reduced ends on the cross bars transfixing said registering ends as hinge pins, and readily-releasable fasteners retaining the links on the hinge pins.

2. A ladder-like timing or patterning chain, comprising two spaced selvedge chains connected and spaced by long parallel cross bars, each of which selvedge chains consists of interchangeable and removable links, each having two spaced pivot holes, arranged in succession with overlapping ends whereat the first holes register, reduced ends on the cross bars transfixing said registering ends as hinge pins, a groove in each reduced end at the outer face of the links transfixed thereby, and a spring clip engaging in said groove for retaining the links.

3. A chain according to claim 2, wherein each fastener clip engages two bars.

4. A chain according to claim 2, wherein each clip is hair-pin shaped, having its bend seating in the groove in one bar and its ends curving partly round and seating in the groove in the next bar.

5. A ladder-like timing or patterning chain, comprising two spaced selvedge chains connected and spaced by long parallel cross bars, each of which selvedge chains consists of interchangeable and removable links, each having two spaced pivot holes, arranged in succession in the order 2, 1, 2 etc., with each end of a single link sandwiched between the ends of the next pair of links with the holes in the said ends of the three links in register, reduced ends on the cross bars transfixing said registering holes as hinge pins, and readily-releasable fasteners retaining the links on the hinge pins.

6. For a knitting machine, a control chain built of interchangeable links and of interchangeable cross bars and capable of being readily built up to any required length by the addition of links and cross bars, having at each edge a succession of the interchangeable links with their adjacent ends overlapping and having each end of each cross bar transfixing at least two such link ends for thereby connecting them and for spacing the two successions of links apart, and studs or cams releasably fixed to the cross bars at spaced locations in the length and width of the chain.

THOMAS KILBOURN.

REFERENCES CITED

The following references are of record in the file of this patent:

UNITED STATES PATENTS

| Number | Name | Date |
|---|---|---|
| 1,528,357 | Zwicky | Mar. 3, 1925 |
| 2,306,948 | Howie | Dec. 29, 1942 |
| 371,607 | Marlin | Oct. 18, 1887 |
| 1,947,421 | Mize | Feb. 13, 1943 |

FOREIGN PATENTS

| Number | Country | Date |
|---|---|---|
| 542,367 | Germany | Jan. 23, 1932 |
| 212,083 | Germany | July 21, 1909 |